US012729975B2

(12) United States Patent
Sahara et al.

(10) Patent No.: US 12,729,975 B2
(45) Date of Patent: Sep. 8, 2026

(54) DISPLAY CONTROL APPARATUS, DISPLAY DEVICE, AND DISPLAY CONTROL METHOD

(71) Applicant: Nippon Seiki Co., Ltd., Niigata (JP)

(72) Inventors: Yusuke Sahara, Niigata (JP); Midori Watanabe, Niigata (JP); Hanako Honma, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 156 days.

(21) Appl. No.: 18/892,826

(22) Filed: Sep. 23, 2024

(65) Prior Publication Data

US 2025/0137801 A1 May 1, 2025

(30) Foreign Application Priority Data

Oct. 27, 2023 (JP) ................................ 2023-184330

(51) Int. Cl.
*G01C 21/36* (2006.01)
*G09G 3/00* (2006.01)

(52) U.S. Cl.
CPC ..... *G01C 21/3676* (2013.01); *G01C 21/3632* (2013.01); *G01C 21/365* (2013.01); *G09G 3/001* (2013.01); *G09G 2340/0407* (2013.01); *G09G 2380/10* (2013.01)

(58) Field of Classification Search
CPC .............. G09G 2380/10; G01C 21/365; G01C 21/3676
See application file for complete search history.

(56) References Cited

U.S. PATENT DOCUMENTS

2023/0003539 A1* 1/2023 Ejiri .................... G01C 21/367

FOREIGN PATENT DOCUMENTS

JP 2021-051231 A 4/2021
WO 2021/132553 A1 7/2021

* cited by examiner

*Primary Examiner* — Matthew Salvucci
(74) *Attorney, Agent, or Firm* — Rimon P.C.

(57) ABSTRACT

To ensure stable vision and reduce discomfort caused by the disappearance of an own vehicle mark when approaching an intersection, display control switches from a wide-area to a narrow-area map display. When the vehicle's distance to an intersection exceeds a first threshold, a control unit shows a first map at a wide scale, displaying the vehicle's position in a bird's-eye view of the surrounding area. As the vehicle approaches the intersection and the distance falls below the threshold, the control erases the vehicle mark and switches to a second map with a larger scale, focusing on the intersection vicinity. A guide mark then indicates the vehicle's traveling direction by adjusting the map's scale.

9 Claims, 9 Drawing Sheets

FIG. 4A
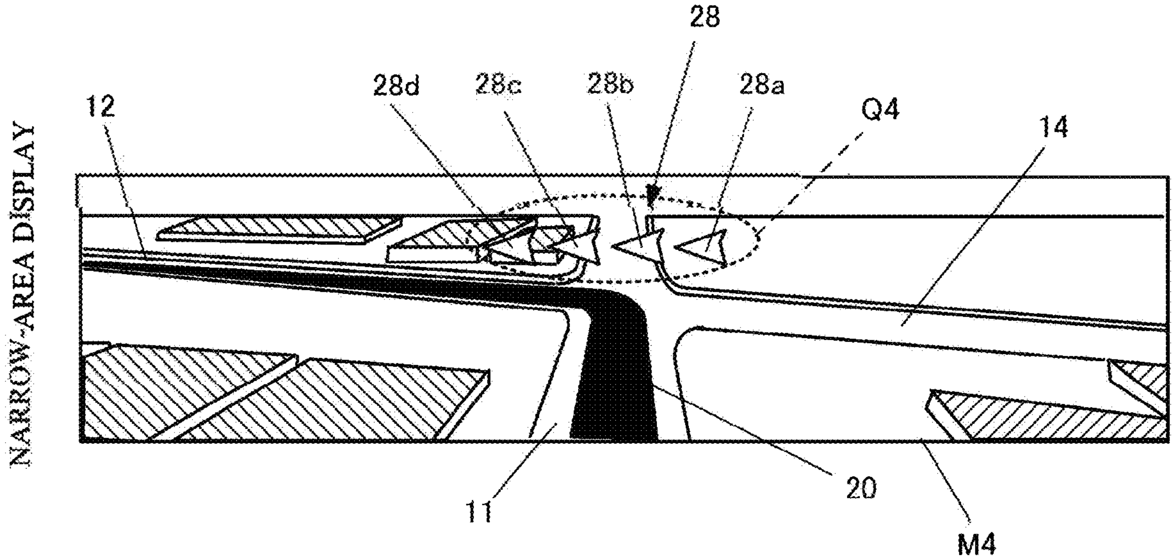
FIG. 4B
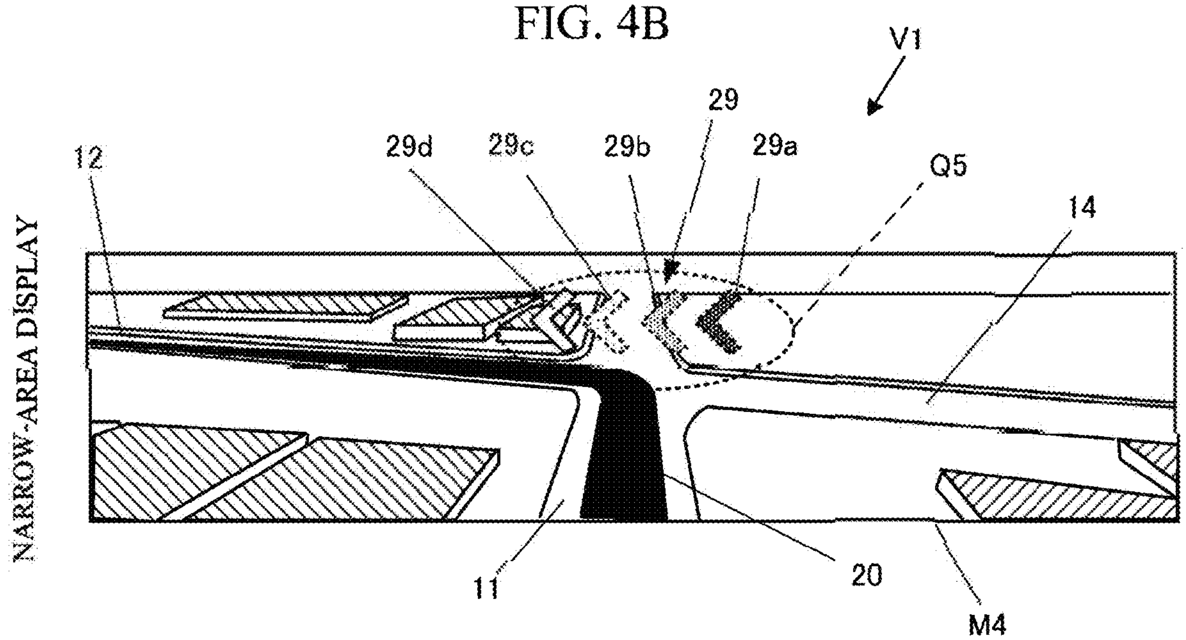

DISPLAY CONTROL APPARATUS, DISPLAY DEVICE, AND DISPLAY CONTROL METHOD

CROSS-REFERENCE TO RELATED APPLICATIONS

This application claims the benefit of Japanese Patent Application No. 2023-184330, filed on Oct. 27, 2023, the entire disclosure of which Application is incorporated by reference herein.

TECHNICAL FIELD

The present invention relates to, for example, a display control apparatus mounted in a vehicle such as an automobile, a display device, and a display control method.

BACKGROUND ART

Patent Document 1 discloses a technique related to map display that effectively avoids an increase in the burden on a driver and enables the driver to intuitively grasp a point of a right turn, a left turn, or the like, without fail.

Further, Patent Document 2 discloses an example of, in a head-up display (HUD) device, a slope HUD (inclined surface HUD) in which a virtual image display surface (imaging surface), which is virtual, for displaying a virtual image is a flat surface or a curved surface inclined with respect to a road surface of a road where a vehicle is traveling.

PRIOR ART DOCUMENT

Patent Document

Patent Document 1: International Publication WO 2021/132553

Patent Document 2: Japanese Unexamined Patent Publication No. 2021-51231

SUMMARY OF INVENTION

Technical Problem

Related Art

The contents of the related art described in FIG. 2 of Patent Document 1 will be briefly described below with reference to FIG. 9.

Here, FIG. 9 is a diagram illustrating a related art having substantially the same contents as FIG. 2 of Patent Document 1.

In FIG. 9, for convenience of explanation, some of the reference numerals are different from those in FIG. 2 of Patent Document 1.

Similarly, in FIG. 9, the characters (for example, the phrases “wide-area display” and “narrow-area display”), which are not described in FIG. 2 of Patent Document 1, are added.

In FIG. 9, a driving scene is assumed in which the vehicle travels straight on a road where the vehicle is currently traveling, turns left at an intersection ahead (here, a branch road that is a crossroad), travels straight on the road after the left turn, turns left at the next intersection (here, a branch road that is a T-junction branching into left and right), and then travels straight a little to reach the destination.

In FIG. 9, the HUD device displays a map corresponding to the above-described driving scene (a map as a bird’s-eye view ahead of the vehicle), and on the map, a guide line (a linear or band-like route guide displayed in a predetermined design (color, luminance, etc.) and displayed to be superimposed on a road surface) 200 indicating a travel route, an own vehicle mark 230 indicating the position of the own vehicle, a destination mark 220 indicating a destination, icons of main buildings, and the like are displayed.

Further, the HUD device switches the scale of the map in accordance with the guide point (here, the distance to the branch point of the above-described crossroad), or performs a scale change process such as increasing the scale with time (switching control of wide-area display/narrow-area display).

A-1 and A-2 of FIG. 9 illustrate a display example (display example of the wide-area display) in a period until the distance between the own vehicle and the guide point (here, the intersection of the above-described crossroad) reaches a first display switching determination distance TH10.

In A-2, the scale (magnification) of the map or the like is increased as compared with A-1 in accordance with the decrease in the distance between the own vehicle and the intersection.

A-3 and A-4 in FIG. 9 illustrate a display example (display example of a first half of the narrow-area display) in a period in which the distance between the own vehicle and the guide point (the intersection of the crossroad) is equal to or more than the first display switching determination distance TH10 and equal to or less than a second display switching determination distance TH20.

In A-4, the scale (magnification) of the map or the like is increased as compared with A-3 in accordance with the decrease in the distance between the own vehicle and the intersection.

A-5 and A-6 of FIG. 9 illustrate a display example (display example of a second half of the narrow-area display) in a case where the distance between the own vehicle and the guide point (the intersection of the crossroad) exceeds the second display switching determination distance TH20.

In A-5 and A-6 of FIG. 9, the enlargement of the scale (magnification) of the map or the like is stopped.

In A-5 of FIG. 9, the display of the map, the guide line 200, and the icon of the building is maintained. However, in A-5 of FIG. 9, a mark 270 indicating the course at a predetermined point (guide point) after a left turn is displayed.

In A-6 of FIG. 9, the map is erased, and only the mark 270 (including a base end portion 270A and an arrow 270B at a leading end portion) indicating the course is displayed.

Issue Found by Inventors of Present Invention

As a result of studies by the inventors of the present invention, the following issue has been found.

(1) In FIG. 9 described above, the own vehicle mark (the reference numeral 230) indicating the own vehicle position is erased at the switching timing from the wide-area display to the narrow-area display (in other words, the transition timing from A-2 to A-3 in FIG. 9).

This visual change may cause a viewer to feel discomfort or confusion.

(2) The present inventors have studied the application of the related art illustrated in FIG. 9 above to a slope HUD (inclined surface HUD).

Here, in the slope HUD (inclined surface HUD), the own vehicle mark (the reference numeral 230) is displayed with a sense of depth in accordance with the shape, the inclination angle, or the like, of the inclined virtual image display surface (in other words, to give a visual sense in which a sense of depth extending from the near side to the far side is emphasized as viewed from the viewer on the road surface of the road) and has a large influence on the visual sense of the viewer.

When the own vehicle mark (the reference numeral 230) that gives a characteristic visual sense in which the sense of depth or the like is emphasized suddenly disappears at the time of switching between the wide-area display and the narrow-area display, the viewer is more likely to feel the sense of disappearance described above. Therefore, it is preferable to take some measures particularly when the slope HUD is used.

(3) In the related art of FIG. 9 described above, a mark such as a guide display indicating the traveling direction is not displayed at all during a period in which the own vehicle is making a left turn or a right turn, and in this respect, there is a limit to improvement in the convenience of the HUD device (display device in a broad sense).

The above issue has been clarified by the present inventors.

An object of the present invention is to achieve the display control capable of suppressing a sense of discomfort caused by the disappearance of an own vehicle mark indicating an own vehicle position and ensuring stable vision when an own vehicle approaches an intersection and a display image including a map is switched from a wide-area display to a narrow-area display.

Another object of the present invention is to make it possible to display a mark such as a guide display indicating a traveling direction even during a period in which an own vehicle is making a left turn or a right turn, thereby improving the convenience of a display device.

Other objects of the present invention will become apparent to those skilled in the art by referring to the following aspects and best mode for carrying out the invention and the accompanying drawings.

Solution to Problem

Hereinafter, in order to easily understand the outline of the present invention, the aspects according to the present invention will be exemplified.

According to a first aspect, a display control apparatus is a display control apparatus including a control unit that controls image display of a display device that is mounted in a vehicle and causes a viewer who is an occupant of the vehicle to visually recognize an image, and the control unit performs wide-area display control to, when a distance from the vehicle to an intersection ahead of the vehicle is more than a first threshold under a driving situation in which the vehicle needs to turn left or right at the intersection, display, at a first scale, a first map that is a bird's-eye view of a surrounding area including an area ahead of the vehicle, and display an own vehicle mark having a predetermined shape capable of indicating a position of the vehicle and indicating a traveling direction of the vehicle to overlap with a first road on the first map corresponding to a road where the vehicle is actually traveling, and performs narrow-area display control to, when the vehicle further approaches the intersection and the distance from the vehicle to the intersection becomes equal to or less than the first threshold, erase the own vehicle mark, display, at a second scale larger than the first scale, a second map that is a bird's-eye view of the vicinity of the intersection, and display a guide mark having a shape identical or similar to the predetermined shape of the own vehicle mark and indicating a traveling direction of the vehicle at a first position of the first road on the second map to overlap with the first road by adjusting the scale so as not to interfere with visual recognition of the intersection on the second map.

In the first aspect, when switching from the wide-area display to the narrow-area display, a guide mark (guide display) indicating the traveling direction of the own vehicle is displayed instead of the own vehicle mark indicating the own vehicle position.

In the narrow-area display, the scale of the map increases; however, when the own vehicle mark indicating the own vehicle position is displayed without being erased, the own vehicle mark is enlarged in accordance with the change in the scale described above and covers the route to the intersection on the map, and visual recognition by the viewer may be difficult.

Therefore, in this aspect, the own vehicle mark is erased.

However, on the other hand, in order to suppress a sense of discomfort or confusion due to the disappearance of the own vehicle mark, a guide mark which has a shape identical or similar to the own vehicle mark and whose scale has been adjusted is displayed.

In this aspect, the own vehicle mark itself is designed to have a predetermined shape (a figure such as a triangle or an arrow) capable of indicating the traveling direction of the own vehicle, and therefore, the own vehicle mark has not only a function as a mark indicating the own vehicle position but also a function of indicating the traveling direction of the own vehicle.

Therefore, in a case where the guide mark having the identical or similar shape is displayed at a position (first position) slightly ahead as viewed from the viewer, for example, to overlap with the same road and in an appropriate size that does not interfere with the visual recognition of the intersection on the map instead of the own vehicle mark displayed to overlap with the road on the map, even when the viewer perceives the guide mark in the field of view, the viewer recognizes the guide mark as the same visual sense as the previous own vehicle mark, and thus seamless visual sense is obtained, and the sense of discomfort and confusion due to the disappearance of the own vehicle mark can be sufficiently suppressed.

In a second aspect depending on the first aspect, when the vehicle further approaches the intersection and the distance from the vehicle to the intersection become equal to or less than a second threshold that is less than the first threshold, the control unit may move a display position of the guide mark from the first position to a second position that is farther than the intersection on the second map as viewed from the viewer or to a third position that is a position overlapped with a branch road of the intersection on the second map and may change the traveling direction indicated by the guide mark to an extending direction of the branch road.

In the second aspect, the guide mark is also used as a course change guide indicating the direction of a left turn or a right turn.

Since the guide mark is a mark having a function of guiding the traveling direction of the own vehicle as a main function, the guide mark can be used not only to guide the course to the intersection but also as a course change guide indicating the direction of a left turn or a right turn after reaching the intersection.

Therefore, it is possible to perform various guide displays which cannot be performed in the related art, and it is possible to improve the convenience of the display device such as the HUD device.

In a third aspect depending on the first or second aspect, the control unit may perform display control to display a display image as a virtual image on a virtual image display surface that is virtual and is a flat surface or a curved surface inclined with respect to a road surface of a road where the vehicle is traveling, may set the predetermined shape of the own vehicle mark to be a shape that causes the viewer to perceive a sense of depth corresponding to at least one of a shape of the virtual image display surface and an inclination angle with respect to the road surface, and may set a shape of the guide mark to be a shape that causes the viewer to perceive a sense of depth that is common to the sense of depth in the own vehicle mark when the guide mark is displayed in a posture and a position that are common to the own vehicle mark.

In the third aspect, a display technique such as a slope HUD that displays an image (virtual image) on a virtual image display surface (imaging surface) of an inclined surface is used.

Here, when the own vehicle mark is designed to cause the viewer to perceive an appropriate sense of depth in accordance with the shape of the virtual image display surface (imaging surface) and the inclination angle with respect to the road surface, the guide mark also has a shape that generates a common (in other words, the same (including substantially the same) or similar) sense of depth when displayed in the same posture and at the same position.

When the slope HUD or the like is used, the own vehicle mark is often displayed with a sense of depth in accordance with the shape, the inclination angle, or the like, of the inclined virtual image display surface (in other words, to give a visual sense in which a sense of depth extending from the near side to the far side is emphasized as viewed from the viewer on the road surface of the road), and has a large influence on the visual sense of the viewer.

When the own vehicle mark that gives a characteristic visual sense suddenly disappears at the time of switching between the wide-area display and the narrow-area display, the viewer is more likely to feel the sense of disappearance; however, according to the present aspect, when the wide-area display is switched to the narrow-area display, since the sense of depth of each mark is common, a seamless visual sense is obtained, and thus it is possible to sufficiently suppress a sense of discomfort or confusion.

In a fourth aspect depending on the second aspect, the control unit may perform, during a turning period in which the vehicle is turning in accordance with a left turn or a right turn, for the guide mark, display mode change control to change at least one of a shape, a pattern, a color, and luminance, display mode change control to divide the guide mark into a plurality of images, display mode change control to divide the guide mark into a plurality of images and change at least one of a shape, a pattern, a color, and luminance, display mode change control to divide the guide mark into a plurality of images, provide a period in which one image before the division and the plurality of images after the division coexist at the time of the division, cause the one image to fade out with time, and cause the plurality of images to fade in with time, or display mode change control to rotate the guide mark around at least one coordinate axis of a display coordinate system set in a space ahead of the vehicle and used for displaying an image, or rotate the guide mark around at least one coordinate axis of a local coordinate system set corresponding to the intersection in the space ahead.

In the fourth aspect, it is assumed that the guide mark indicates the traveling direction of the vehicle at the time of a left turn or a right turn (in other words, the direction of a left turn or a right turn) (the case of the second aspect described above), and a plurality of modifications of the display mode of the guide mark in this case are exemplified.

For example, by changing at least one of the shape, the pattern, the color, and the luminance of the guide mark, the viewer can easily perceive the moving direction.

Further, for example, by dividing the guide mark as one image into a plurality of parts and increasing the number of elements (guide elements) constituting the guide mark, it is possible to realize a display which is easy to see and easy to perceive a direction.

Further, for example, by providing a period in which one image of a guide mark before division and a guide mark including a plurality of images (in other words, a plurality of guide elements) after the one image is divided into the plurality of images are displayed together, and gradually decreasing the luminance of the one image with time to fade out while gradually increasing the luminance of the guide mark including the plurality of images (the plurality of guide elements) with time to fade in, the transition from the image before division to the image after division can be a seamless transition with a reduced sense of discomfort, and it is possible to realize a display which is easy to see and easy to perceive a direction.

Further, at the time of fade-in, by performing display control in which the luminance, color, or the like of a part of the plurality of images (the plurality of guide elements) is made different from the luminance, color, or the like of the other images (the other guide elements), it is possible to further improve the visibility and to further facilitate the perception of the direction.

Further, for example, by rotating the guide mark around the coordinate axis of the display coordinate system or the coordinate axis of the local coordinate system appropriately set corresponding to the extending direction of the branch road at the intersection or the like, it is possible to appropriately and dynamically change how the guide mark looks like as viewed from the viewer, and thus an unconventional visual sense can be produced so that the visibility is further improved.

In a fifth aspect depending on any one of the first to fourth aspects, during a turning period in which the vehicle is turning in accordance with a left turn or a right turn, the control unit may change a display mode of the guide mark to dynamically change a traveling direction indicated by the guide mark to correspond to the turning of the vehicle.

In the fifth aspect, the guide mark can also be used as, for example, a turning guide or the like indicating that the own vehicle is turning smoothly in association with a left turn or a right turn.

Since the guide mark is a mark having a function of guiding the traveling direction of the own vehicle as a main function, the guide mark can be used not only to guide the course to the intersection but also as a turning guide for dynamically indicating a change in the traveling direction during turning of the own vehicle after reaching the intersection.

Therefore, it is possible to perform various guide displays which cannot be performed in the related art, and it is possible to further improve the convenience of the display device such as the HUD device.

In a sixth aspect depending on the fifth aspect, when it is determined that a trajectory of an actual turning of the vehicle deviates from a normal trajectory, a display mode of the guide mark may be changed to a display mode of a warning display that gives a warning to the viewer.

According to the sixth aspect, when a turn deviating from the normal trajectory is recognized in the middle of turning of the vehicle, a warning can be issued by changing the display mode of the guide mark. Accordingly, for example, it is possible to prompt the viewer to perform an appropriate driving operation and to assist the viewer to return to the normal trajectory.

In a seventh aspect, a display device includes a display unit that displays an image, and the display control apparatus according to any one of the first to sixth aspects.

According to the seventh aspect, it is possible to realize a display device with high functionality and improved convenience.

In an eighth aspect depending on the seventh aspect, the display device may be a projection display device that projects display light of an image displayed on the display unit onto a projection target member to display the image as a virtual image on a virtual image display surface.

According to the eighth aspect, it is possible to realize a projection display device with high functionality and improved convenience.

As the projection display device, typically, a head-up display (HUD) device or a windshield display (WSD) device can be used. The term "projection display device" is to be interpreted broadly. The projection target member may be a windshield or the like of a vehicle. Further, the projection target member may be a glasses portion of a glasses head mounted display, and in this case, the head mounted display can be grasped as a kind of a head-up display in a broad sense. Therefore, it can be included in the present invention.

In a ninth aspect, a display control method is a display control method for controlling image display of a display device that is mounted in a vehicle and causes a viewer who is an occupant of the vehicle to visually recognize an image, and the display control method includes a step of performing wide-area display control to, when a distance from the vehicle to an intersection ahead of the vehicle is more than a first threshold under a driving situation in which the vehicle needs to turn left or right at the intersection, display, at a first scale, a first map that is a bird's-eye view of a surrounding area including an area ahead of the vehicle, and display an own vehicle mark having a predetermined shape capable of indicating a position of the vehicle and indicating a traveling direction of the vehicle to overlap with a first road on the first map corresponding to a road where the vehicle is actually traveling, and a step of performing narrow-area display control to, when the vehicle further approaches the intersection and the distance from the vehicle to the intersection becomes equal to or less than the first threshold, erase the own vehicle mark, display, at a second scale larger than the first scale, a second map that is a bird's-eye view of the vicinity of the intersection, and display a guide mark having a shape identical or similar to the predetermined shape of the own vehicle mark and indicating a traveling direction of the vehicle at a first position of the first road on the second map to overlap with the first road by adjusting the scale so as not to interfere with visual recognition of the intersection on the second map.

According to the ninth aspect, it is possible to achieve the display control capable of suppressing a sense of discomfort caused by the disappearance of the own vehicle mark indicating the own vehicle position and ensuring stable vision when the own vehicle approaches the intersection and the display image including the map is switched from the wide-area display to the narrow-area display.

BRIEF DESCRIPTION OF DRAWINGS

FIGS. 4A and 4B are diagrams illustrating an example of a display using a guide mark including a plurality of images (a plurality of guide elements) in the narrow-area display.

FIG. 5 is a diagram illustrating another example (an example in which fade-in and fade-out are performed in parallel) of display using a guide mark including a plurality of images (a plurality of guide elements) in the narrow-area display.

DESCRIPTION OF EMBODIMENTS

The best embodiment described below is used for easy understanding of the present invention. Therefore, those skilled in the art should note that the present invention is not unreasonably limited by the embodiment described below.

First Embodiment

Figure 1:
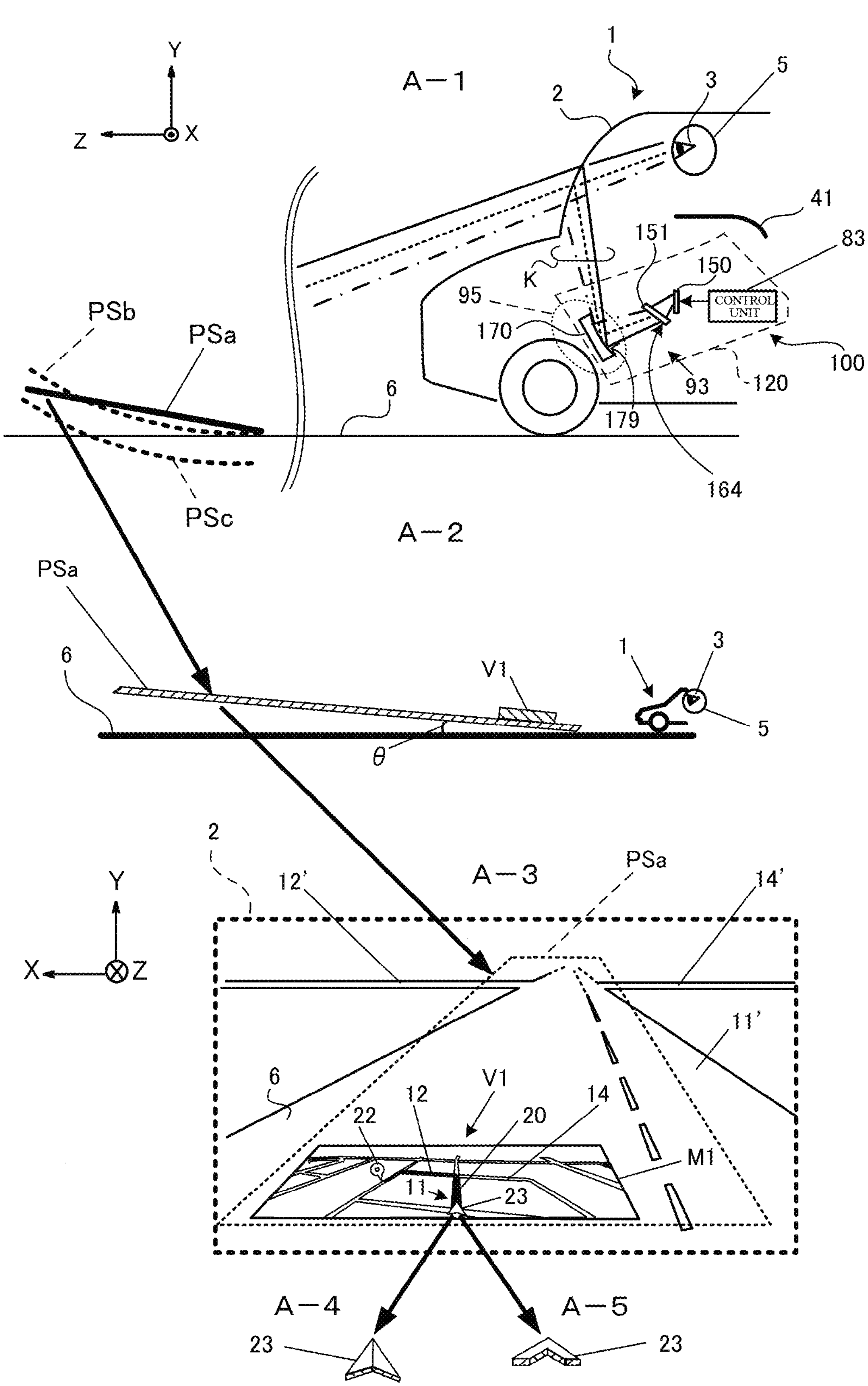
FIG. 1 is a diagram illustrating an example of a case where an image (virtual image) including a map and an own vehicle mark is displayed by a slope HUD (inclined surface HUD).

A reference is made to FIG. 1. FIG. 1 is a diagram illustrating an example of a case where an image (virtual image) including a map and an own vehicle mark is displayed by a slope HUD (inclined surface HUD).

In FIG. 1, the width direction of a vehicle 1 is defined as an X direction (lateral direction), the height direction of the vehicle 1 is defined as a Y direction (vertical direction), and the direction indicating the forward and backward directions of the vehicle 1 is defined as a Z direction (front-back direction). This also applies to FIGS. 3, 4, 6, and 7.

Further, although the term "mark" is used in the following description, this term can be replaced with a synonymous term such as "icon".

In A-1 of FIG. 1, an in-vehicle HUD device 100 is housed in a dashboard 41 of the vehicle 1. The HUD device 100 can display an image (virtual image) V1 (see A-2 in FIG. 1) on virtual image display surfaces (imaging surfaces) PSa to PSc that are virtual inclined surfaces.

In the following description, the technique for displaying the image (virtual image) on the inclined virtual image display surface (imaging surface) or an HUD device capable of displaying the image may be referred to as a "slope HUD (inclined surface HUD)".

A device main body 120 of the HUD device 100 includes a display device (image generation unit) 150 such as a liquid crystal panel, a screen (display unit) 151 including a display surface 164, a curved mirror (concave mirror or the like) 170 including a reflection surface 179 of light, and a control unit 83 that performs display control of an image.

The curved mirror 170 is a constituent element of a display optical system 95. The display device 150, the screen 151, and the curved mirror 170 constitute a projection unit 93.

The curved mirror 170 reflects light from the screen (display unit) 151 and projects display light K onto a windshield (projection target member) 2 provided in the vehicle 1. A part of the display light K is reflected by the windshield (projection target member) 2 and is incident on a viewpoint (eye) 3 of a viewer (for example, a driver) 5 as an occupant riding in the vehicle 1, and a virtual image is displayed on the virtual image display surfaces PSa to PSc.

Each of the virtual image display surfaces PSa to PSc is a virtual inclined surface that is inclined with respect to a road surface 6 of the road. The virtual image display surface PSa has a flat shape, and the virtual image display surfaces PSb and PSc have a curved shape.

A part of the virtual image display surface PSc is located at a position lower than the road surface 6. The image (virtual image) formed on this portion is actually recognized in the brain of the viewer 5 as if it is superimposed on the road surface 6.

The curvature of the reflection surface 179 of the curved mirror (concave mirror or the like) 170 is not uniform, for example, a free-form surface is used, and the reflectance of the reflection surface 179 is appropriately changed in accordance with the position in the vertical direction so that the shape of the virtual image display surface and the inclination angle (the symbol θ in A-2 of FIG. 1) with respect to the road surface 6 can be changed.

In A-2 of FIG. 1, the virtual image display surface PSa which is a flat surface is used. As illustrated in A-2 of FIG. 1, the image (virtual image) V1 is displayed in a region near an end portion of the virtual image display surface PSa on the side close to the viewer 5 (in other words, a region on the near side as viewed from the viewer 5).

A-3 of FIG. 1 illustrates, as the actual view ahead of the vehicle 1, a road (straight road) 11' where the vehicle 1 is currently traveling, a left turn road 12' and a right turn road 14' constituting branch roads of an intersection, the virtual image display surface PSa, which is virtual, and the image (virtual image) V1 displayed in a region on the near side of the virtual image display surface PSa as viewed from the viewer 5.

The virtual image V1 includes a map M1 of a surrounding area including an area ahead of the vehicle 1, a display (destination mark) 22 of the destination, and an own vehicle mark 23 indicating the position of the vehicle (own vehicle) 1.

The map M1 includes a road (straight road) 11 on the map corresponding to the road (straight road) 11' (a road as the actual view) where the vehicle 1 is currently traveling, a left turn road 12 on the map corresponding to the left turn road 12' as the actual view, a right turn road 14 on the map corresponding to the right turn road 14' as the actual view, a guide line 20 indicating a travel route, and an own vehicle mark (own vehicle icon) 23 indicating an own vehicle position.

The guide line 20 is a linear or band-like route guide displayed in a predetermined design (color, luminance, or the like) and is preferably displayed to be superimposed on the road surface. The guide line 20 is represented by a black band-like figure superimposed on the road surface in A-3 of FIG. 1.

Here, the own vehicle mark 23 has a shape designed such that a sense of depth is emphasized in accordance with the shape, the inclination angle, or the like, of the virtual image display surface PSa. As described above, the own vehicle mark 23 has a function of indicating the own vehicle position, and also has a function of indicating the traveling direction of the own vehicle.

In other words, the own vehicle mark 23 is formed in a shape (for example, a triangular shape or an arrow shape) capable of indicating the traveling direction of the vehicle 1.

Specifically, the own vehicle mark 23 has a shape of an arrow close to a triangle in A-3 of FIG. 1, and the traveling direction of the vehicle 1 can be indicated by the orientation of the vertex (top portion) of the end of the figure.

Further, the own vehicle mark 23 may be formed in a three-dimensional arrow shape as illustrated in A-4 of FIG. 1, or may be formed in a three-dimensional arrow shape similar to a boomerang shape as illustrated in A-5 of FIG. 1.

The own vehicle mark 23 having such a shape can indicate the traveling direction of the vehicle 1 by the orientation of the vertex (top portion) of the end of the figure (arrow).

Further, in the examples of A-4 and A-5 of FIG. 1, the own vehicle mark 23 has a three-dimensional shape in order to realize a more easily viewable display (however, the present invention is not limited thereto).

Further, as described above, the own vehicle mark 23 is designed such that the sense of depth is emphasized in accordance with the shape, the inclination angle, or the like, of the virtual image display surface (imaging surface) PSa, which is an inclined surface.

In other words, in a preferred example, the own vehicle mark 23 has a predetermined shape, and the predetermined shape is designed to be a shape that causes the viewer 5 to perceive a sense of depth corresponding to at least one of the shape of the virtual image display surface PSa and the inclination angle θ with respect to the road surface 6.

Figure 3:
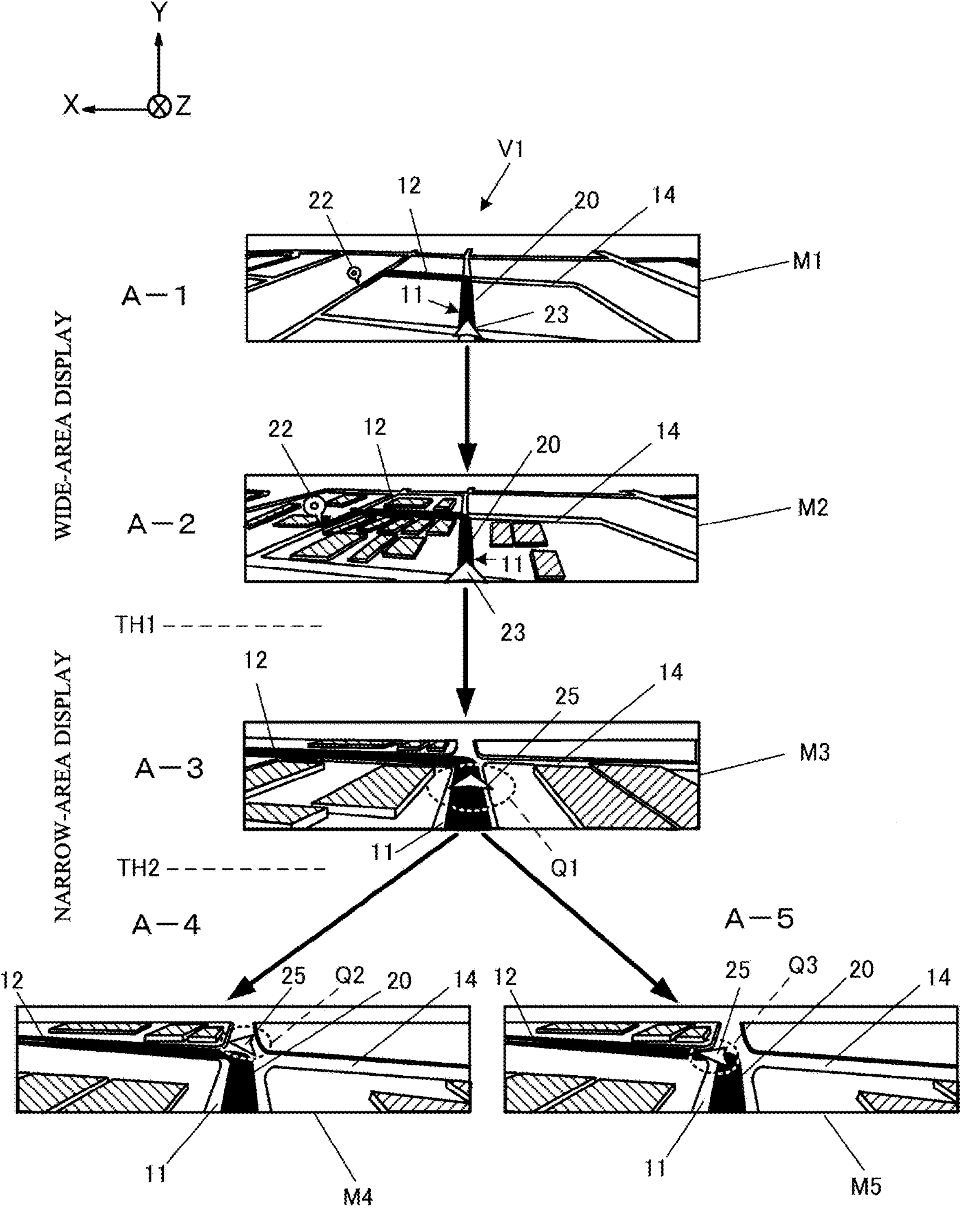
FIG. 3 is a diagram illustrating an example of a wide-area display and a narrow-area display.

In the example of A-3 in FIG. 1, the control unit 83 displays the virtual image V1 as a wide-area display (which may be referred to as a "small-world display") because the distance between the vehicle (own vehicle) 1 and the intersection is more than a first threshold (the reference numeral TH1 in FIG. 3).

When the vehicle (own vehicle) 1 further approaches the intersection and the distance between the vehicle (own vehicle) 1 and the intersection becomes equal to or less than the first threshold TH1, the control unit 83 enlarges the scale of the map and displays the virtual image V1 as a narrow-area display (which may be referred to as "semi-AR display").

According to the present embodiment, in order to suppress the sense of discomfort felt by the viewer 5 due to the disappearance of the own vehicle mark 23 at the time of switching from the wide-area display to the narrow-area display, the control unit 83 displays a guide mark (the reference numeral 25 in FIG. 3) having a shape identical or similar to the own vehicle mark 23 (and preferably a shape that allows the viewer 5 to perceive a common sense of depth) at a position close to the intersection on the map (a position slightly ahead as viewed from the viewer 5) on the road 11 on the map corresponding to the road 11' where the vehicle 1 is currently traveling immediately after the start of the narrow-area display. Details of this point will be described below.

Figure 2:
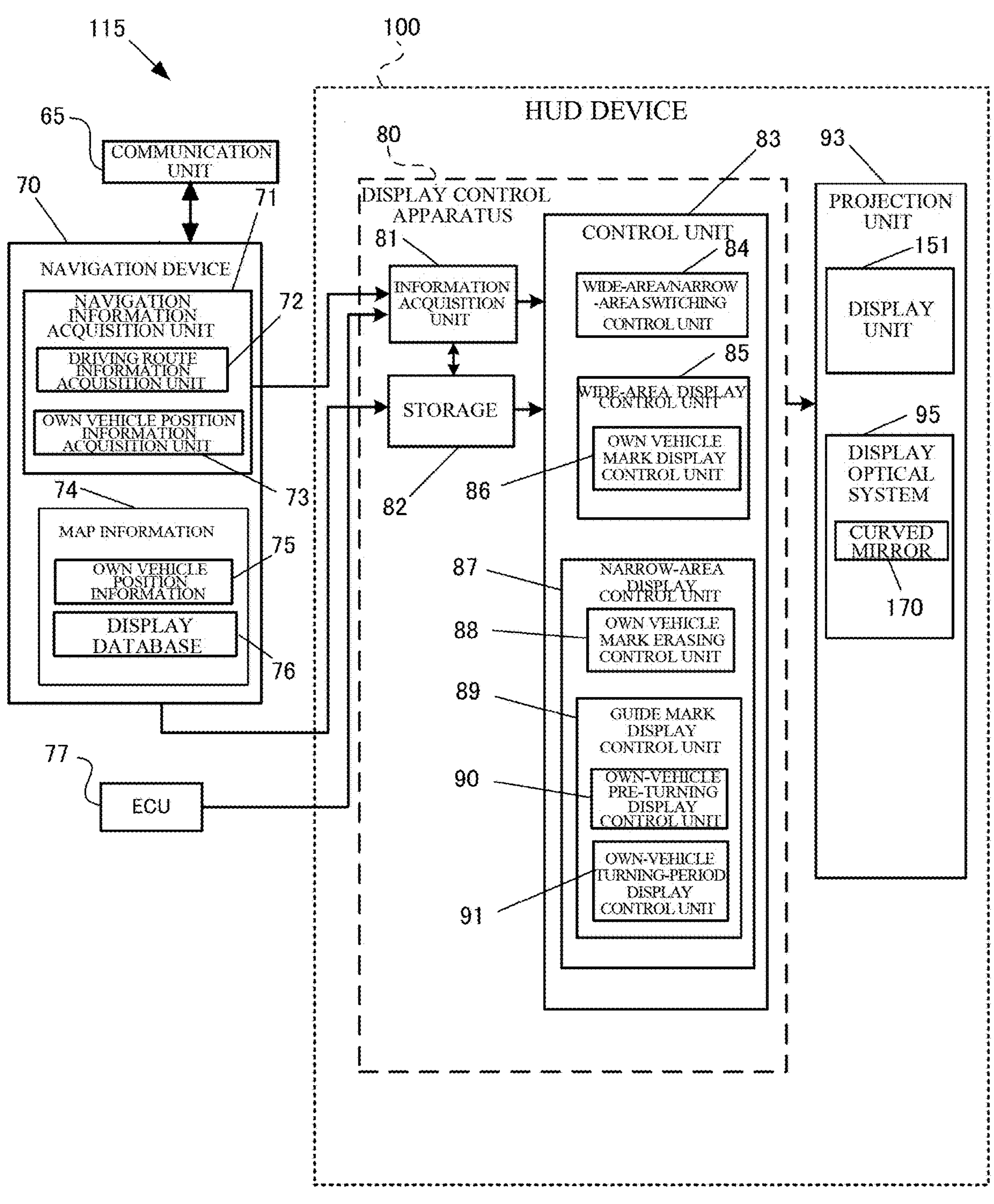
FIG. 2 is a diagram illustrating an example of a configuration of an HUD device as a display device.

Reference is now made to FIG. 2. FIG. 2 is a diagram illustrating an example of a configuration of an HUD device as a display device.

A display system 115 includes a communication unit 65, a navigation device 70, an electronic control unit (ECU) 77 capable of collecting various kinds of vehicle information and the like, and the HUD device 100.

The navigation device 70 includes a navigation information acquisition unit 71 and map information 74. The navigation information acquisition unit 71 includes a driving route information acquisition unit 72 and an own vehicle position information acquisition unit 73. The map information 74 includes own vehicle position information 75 and a display database 76.

The HUD device 100 includes a display control apparatus (processor) 80 and a projection unit 93.

The projection unit 93 includes a display unit (in the example of A-1 of FIG. 1, a screen including a display surface 164) 151 and a display optical system 95 (including a curved mirror 170).

The display control apparatus (processor) 80 includes an information acquisition unit 81, a storage 82, and a control unit 83 that controls display of an image.

The control unit 83 includes a wide-area/narrow-area switching control unit 84 that switches between the wide-area display and the narrow-area display, a wide-area display control unit 85 (including an own vehicle mark display control unit 86 that controls the display of the own vehicle mark 23), and a narrow-area display control unit 87.

The narrow-area display control unit 87 includes an own vehicle mark erasing control unit 88 that erases the own vehicle mark 23 when switching from the wide-area display to the narrow-area display and a guide mark display control unit 89 that performs display control such as displaying the guide mark 25 instead of the own vehicle mark 23.

The guide mark display control unit 89 includes an own-vehicle pre-turning display control unit 90 that performs display control of the guide mark 25 before the own vehicle 1 turns in accordance with a left turn or a right turn and an own-vehicle turning-period display control unit 91 that performs display control of the guide mark 25 during a turning period in which the own vehicle 1 is turning in accordance with a left turn or a right turn.

Reference is now made to FIG. 3. FIG. 3 is a diagram illustrating an example of the wide-area display and the narrow-area display.

Here, as indicated above by A-3 in FIG. 1, the driving situation in which the vehicle (own vehicle) 1 needs to turn left (or right) at the intersection ahead is assumed.

A-1 of FIG. 3 illustrates the navigation image including the map M1 and the own vehicle mark 23 indicating the own vehicle position.

The content of the display image in A-1 of FIG. 3 is the same as that described above in A-3 of FIG. 1, and a duplicated detailed description thereof will be omitted.

In A-1 of FIG. 3, the map M1 is displayed at a first scale.

Furthermore, in A-1 of FIG. 3, the own vehicle mark 23 having a predetermined shape (for example, the figure of an arrow indicated by A-3 to A-5 of FIG. 1) capable of indicating the position of the own vehicle and indicating the traveling direction of the own vehicle on the map M1 is displayed to overlap with the road 11 on the map M1 corresponding to the road 11' in the actual view where the vehicle 1 is actually traveling.

According to the present embodiment, it is assumed that the own vehicle mark 23 has a shape designed to emphasize the sense of depth in accordance with the shape, the inclination angle θ, or the like, of the virtual image display surface PSa illustrated above in A-3 of FIG. 1.

In A-2 of FIG. 3, the scale of the display image is enlarged as the vehicle 1 travels forward.

In other words, in A-2 of FIG. 3, a map M2 and the own vehicle mark 23 whose size is slightly enlarged are displayed.

At the time when A-1 and A-2 in FIG. 3 are displayed, the distance between the vehicle 1 and the intersection in the actual view is more than the first threshold TH1, and thus the wide-area display (small-world display) is performed. In other words, the maps M1 and M2 are maps as a bird's-eye view of a surrounding area including the area ahead.

On the maps M1 and M2, the route along which the vehicle 1 is to travel is displayed by a guide line (here, a band-shaped figure whose color, brightness, and the like, are adjusted and which is displayed to be superimposed on the route (road) where the vehicle 1 is to travel: in the drawing, illustrated as a black band-shaped FIG. 20, and a destination display (destination icon) 22 is displayed at the destination.

In A-3 of FIG. 3, since the distance between the own vehicle 1 and the intersection in the actual view is equal to or less than the first threshold TH1, the wide-area display (small-world display) is switched to the narrow-area display (semi-AR display). Accordingly, the scale of the map is increased.

In A-3 of FIG. 3, the scale of the map M3 is a second scale larger than the first scale.

In A-3 of FIG. 3, the map M3 is a considerably enlarged map (a bird's-eye view of the vicinity of the intersection) as compared with the map M2 illustrated in A-2 of FIG. 3, and major buildings are also displayed considerably largely.

In A-3 of FIG. 3, the own vehicle mark 23 indicating the own vehicle position, which has been displayed until immediately before, is erased, and instead, a guide mark 25 indicating the traveling direction of the vehicle 1 is displayed at a first position Q1 indicated by a broken-line ellipse. Such display control is performed by the own-vehicle pre-turning display control unit 90 illustrated above in FIG. 2.

In the narrow-area display, the scale of the map increases; however, when the own vehicle mark 23 indicating the own vehicle position is displayed without being erased, the own vehicle mark 23 is enlarged in accordance with the change in the scale described above and covers the route to the intersection on the map, and visual recognition by the viewer may be difficult. Therefore, the own vehicle mark 23 is erased. However, in order to reduce a sense of discomfort due to a visual change caused by the erasing, the guide mark 25 is displayed at the first position Q1 instead of the own vehicle mark 23.

The first position Q1 is set at a position slightly ahead as viewed from the viewer 5 and close to the intersection on the map.

The guide mark 25 is displayed with its scale adjusted so as not to interfere with the visual recognition of the intersection on the map. Further, the guide mark 25 has the shape identical or similar to the own vehicle mark 23, which has been displayed until immediately before, and preferably has a shape with a common sense of depth.

As described above, when the slope HUD or the like is used, the own vehicle mark 23 is often displayed with a sense of depth in accordance with the shape, the inclination angle, or the like, of the inclined virtual image display surface PSa, or the like (in other words, to give a visual sense in which a sense of depth extending from the near side to the far side is emphasized as viewed from the viewer 5 on the road surface 6 of the road), and therefore an effect on the visual sense of the viewer 5 is large.

When the own vehicle mark 23, which gives a characteristic visual sense, suddenly disappears at the time of switching of wide-area display/narrow-area display, the viewer 5 is highly likely to feel a sense of disappearance; however, when the wide-area display is switched to the narrow-area display, the guide mark 25 having the identical or similar shape (preferably, having a common sense of depth) is displayed instead of the own vehicle mark 23, and thus seamless visual sense (continuous visual sense) is obtained, and a sense of discomfort is reduced.

Further, the orientation of the guide mark 25 illustrated in A-3 of FIG. 3 is the same as the orientation indicated by the own vehicle mark 23 displayed previously in A-2 of FIG. 3 (the orientation instructing the vehicle 1 to travel straight).

Although the own vehicle mark 23 is displayed to overlap with the straight road 11 in A-2 of FIG. 3, the guide mark 25 is similarly displayed to overlap with the straight road 11 in A-3 of FIG. 3.

Therefore, in a case where the process shifts from A-2 to A-3 in FIG. 3 and the viewer 5 perceives the guide mark 25 in the field of view, even when the viewer 5 feels that the guide mark is displayed slightly ahead (far), the viewer 5 recognizes the guide mark as the same visual sense as that of the own vehicle mark 23 displayed until immediately before. Therefore, seamless visual sense (continuous visual sense) can be realized, and the sense of discomfort and confusion can be sufficiently suppressed.

As described above, even when the guide mark 25 having the identical or similar shape (preferably, a shape having a common sense of depth) is displayed slightly ahead as viewed from the viewer instead of the own vehicle mark 23 immediately after the switching from the wide-area display to the narrow-area display, the guide mark 25 is, in a preferable example, displayed to overlap with the straight road 11 in the same manner as the own vehicle mark 23, indicates the same direction, and displayed in an appropriate size that does not interfere with the visual recognition of the intersection on the map, and therefore, even when the viewer perceives the guide mark 25 in the field of view, the viewer recognizes the guide mark 25 as the same visual sense as the previous own vehicle mark 23, and thus seamless visual sense is obtained, and the sense of discomfort and confusion due to the disappearance of the own vehicle mark 23 can be sufficiently suppressed.

Further, although it is conceivable to omit A-3 in FIG. 3 and to display the guide marks 25, 25 for instructing the left turn by suddenly shifting from A-2 in FIG. 3 to A-4 or A-5 in FIG. 3, in this case, the visual change is large, and the driver may feel a sudden change and feel a sense of discomfort.

Therefore, first, in A-3 of FIG. 3, the guide mark 25 indicating straight ahead is displayed near the intersection on the map (the first position Q1 near the intersection slightly ahead as viewed from the viewer 5) to secure a natural visual sense.

In A-4 and A-5 of FIG. 3, the distance between the vehicle 1 and the intersection in the actual view is equal to or less than a second threshold TH2 that is smaller than the first threshold.

Accordingly, in A-4 of FIG. 3, the display position of the guide mark 25 is moved from the first position Q1 in A-3 of FIG. 3 to a second position Q2 (indicated by a broken-line ellipse in the drawing) farther than the intersection on the map as viewed from the viewer 5, the orientation of the guide mark 25 is changed, and the traveling direction indicated by the guide mark 25 is changed to the extending direction (left direction) of the branch road (specifically, the left turn road 12).

In A-5 of FIG. 3, the display position of the guide mark 25 is moved from the first position Q1 in A-3 of FIG. 3 to a third position Q3 (indicated by a broken-line ellipse in FIG. 3), which is the position of the branch road of the intersection on the map, and the traveling direction indicated by the guide mark 25 is changed to the extending direction (left direction) of the branch road (specifically, the left turn road 12).

In other words, in A-4 and A-5 of FIG. 3, the guide mark 25 is also used as a course change guide indicating the direction of a left turn (or a right turn).

Since the guide mark 25 is a mark having a function of guiding the traveling direction of the own vehicle as a main function, the guide mark 25 can be used not only to guide the course of the vehicle 1 to the intersection but also as a course change guide indicating the direction of a left turn or a right turn after the vehicle 1 reaches the intersection. Therefore, it is possible to perform various guide displays which cannot be performed in the related art, and it is possible to improve convenience of the HUD device 100 (a display device in a broad sense).

Further, in A-4 and A-5 of FIG. 3, the display mode of the guide mark 25 (for example, at least one of the shape, the pattern, the color, and the luminance of the guide mark) may be changed to a mode different from that of the guide mark 25 in A-3 of FIG. 3.

Accordingly, it is possible to enhance the visual effect when indicating the direction, and the viewer 5 can easily perceive the moving direction.

Second Embodiment

Reference is now made to FIG. 4. FIGS. 4A and 4B are diagrams illustrating examples of display using a guide mark including a plurality of images (a plurality of guide elements) in the narrow-area display.

A-4 and A-5 of FIG. 3 above illustrate an example in which the guide mark 25 is used to indicate the traveling direction of the vehicle 1 when the vehicle 1 turns left.

FIGS. 4A and 4B also illustrate examples in which the guide mark 25 is used to indicate the traveling direction of the vehicle 1 when the vehicle 1 turns left.

However, in FIGS. 4A and 4B, one image is divided into a plurality of images (a plurality of guide elements) or the display mode of each of the plurality of divided images (the plurality of guide elements) is changed to further enhance the visual effect when indicating the direction, which is different from A-4 and A-5 of FIG. 3.

In FIGS. 4A and 4B, it is assumed that a map M4 illustrated above in A-4 of FIG. 3 is displayed.

In FIG. 4A, at a fourth position Q4, the divided images (guide elements) *28a* to *28d* are displayed.

These images (guide elements) *28a* to *28d* are collected to form the single guide mark 28.

In FIG. 4B, at a fifth position Q5, the divided images (guide elements) *29a* to *29d* are displayed, and the display mode of each of the plurality of divided images (the plurality of guide elements) *29a* to *29d* is changed to further enhance the visual effect when indicating the direction.

These images (guide elements) *29a* to *29d* are collected to form the single guide mark 29.

As described above, in FIGS. 4A and 4B, the guide mark 25 displayed as one image in A-4 of FIG. 3 described above is divided into the plurality of images (the plurality of guide elements) 28*a* to 28*d* and 29*a* to 29*d*, and the number of elements (guide elements) constituting the guide mark is increased, so that it is possible to realize the display which is easy to see and easy to perceive a direction.

Third Embodiment

Figure 5:
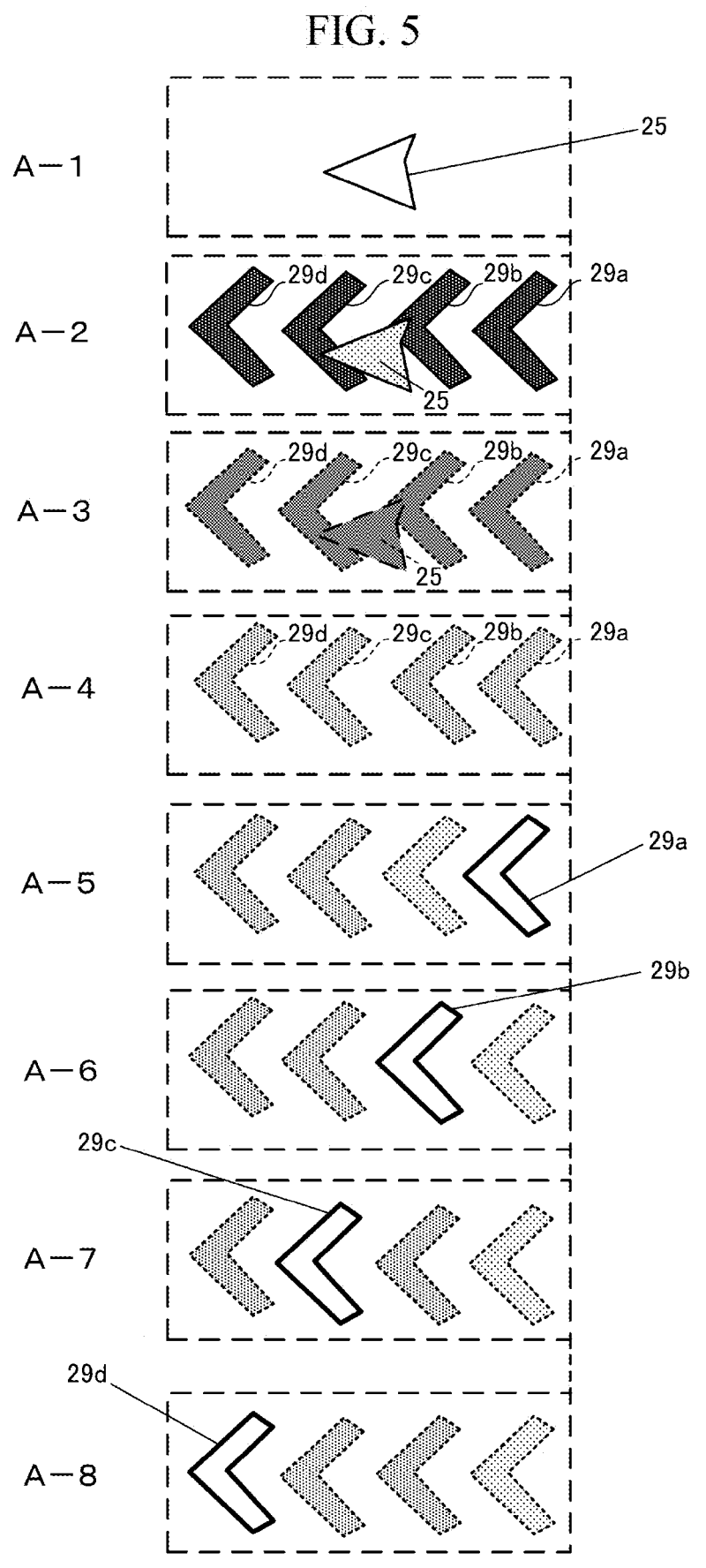

Reference is now made to FIG. 5. FIG. 5 is a diagram illustrating another example (an example in which fade-in and fade-out are performed in parallel) of display using a guide mark including a plurality of images (a plurality of guide elements) in the narrow-area display.

In FIG. 5, the guide mark 25 illustrated above in A-4 of FIG. 3 and the guide mark 29 illustrated above in FIG. 4B are used in combination, and the process of fading out one of them and the process of fading in the other are used in combination.

In A-1 of FIG. 5, the guide mark 25, which is one image before division, is displayed with the normal luminance.

In A-2 of FIG. 5, the plurality of divided images (in other words, the plurality of guide elements) 29*a* to 29*d* is displayed with low luminance, while the luminance of the guide mark 25, which is one image, is reduced.

In A-3 of FIG. 5, the luminance of the plurality of images (the plurality of guide elements) 29*a* to 29*d* after division is further increased, while the luminance of the guide mark 25, which is one image, is further reduced.

In A-4 of FIG. 5, the luminance of the plurality of images (guide elements) 29*a* to 29*d* after division is further increased, while the guide mark 25, which is one image, disappears.

In A-5 of FIG. 5, a highlighting process is performed such that the image (guide element) 29*a* located at the right end among the plurality of images (the plurality of guide elements) 29*a* to 29*d* is displayed in a different color or displayed with higher luminance, for example.

The image (guide element) 29*b* is highlighted in A-6 of FIG. 5, the image (guide element) 29*c* is highlighted in A-7 of FIG. 5, and the image (guide element) 29*d* is highlighted in A-8 of FIG. 5.

In this way, by providing a period in which the one image 25 before division and the image including the plurality of images (the plurality of guide elements) 29*a* to 29*d* after division are displayed together, and by gradually decreasing the luminance of the one image 25 with time to fade out while gradually increasing the luminance of the guide mark including the plurality of images (the plurality of guide elements) 29*a* to 29*d* with time to fade in, the transition from the image 25 before division to the images 29*a* to 29*d* after division can be a seamless transition with a reduced sense of discomfort, and it is possible to realize the display that is easy to see and easy to perceive the direction.

Further, at the time of fade-in, by performing display control in which the luminance, color, or the like of a part of the plurality of images (the plurality of guide elements) 29*a* to 29*d* is made different from the luminance, color, or the like of the other images (the other guide elements), it is possible to further improve the visibility and to further facilitate the perception of the direction.

Fourth Embodiment

Figure 6:
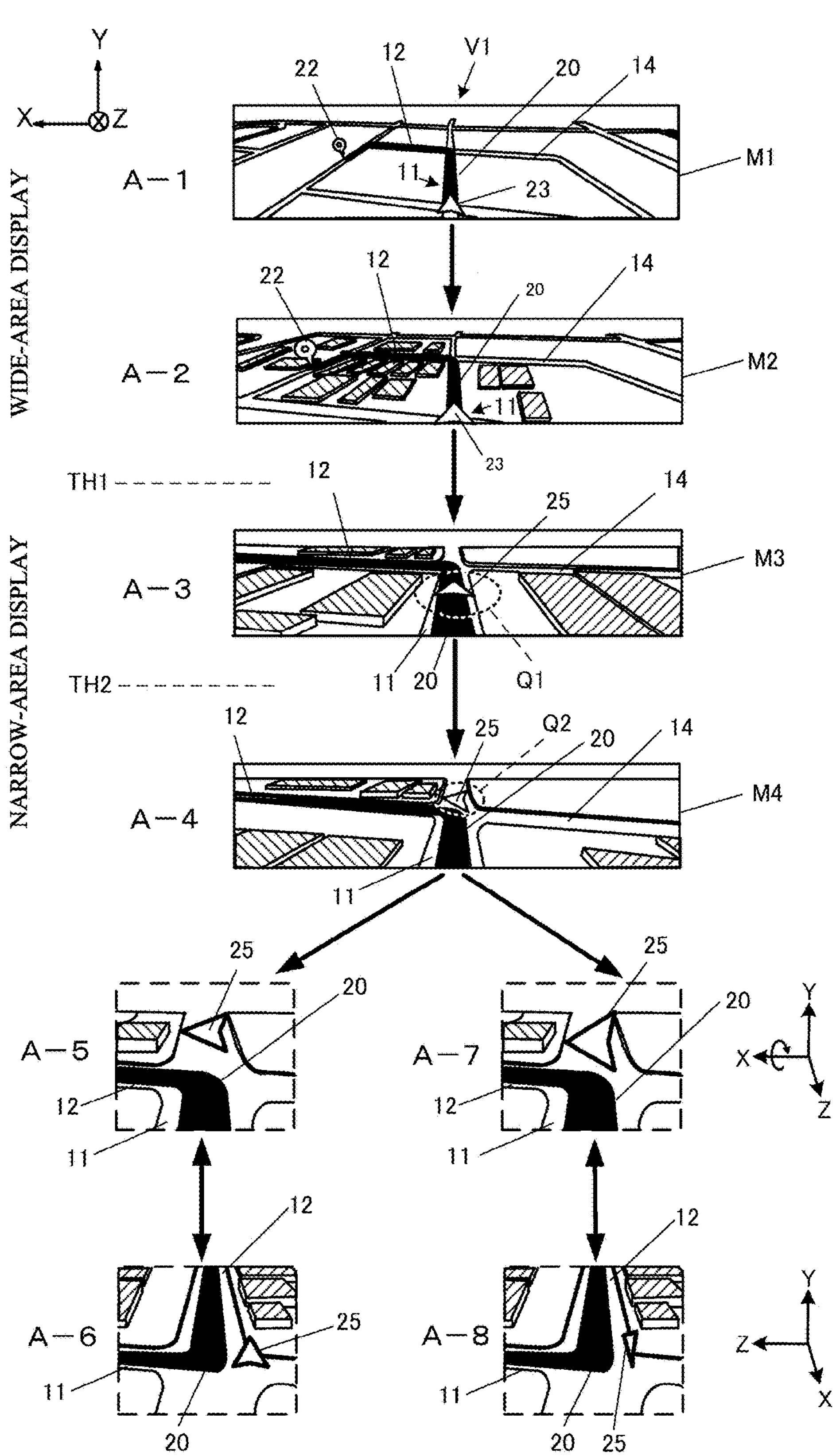
FIG. 6 is a diagram illustrating another example of the wide-area display and the narrow-area display (including an example in which the guide mark is rotated around a coordinate axis).

Reference is now made to FIG. 6. FIG. 6 is a diagram illustrating another example of the wide-area display and the narrow-area display (including an example in which the guide mark is rotated around the coordinate axis).

In FIG. 6, a display process is performed to rotate the guide mark 25 around at least one coordinate axis of a display coordinate system (here, an XYZ orthogonal coordinate system) used for displaying an image set in the space in front of the vehicle 1.

It should be noted that the display mode change control may be performed for the rotation around at least one coordinate axis of a local coordinate system (not illustrated) set corresponding to the intersection in the front space.

In FIG. 6, A-1 to A-3 of FIG. 6 are the same as A-1 to A-3 of FIG. 3 described above. Further, A-4 of FIG. 6 is the same as A-4 of FIG. 3 described above.

A-5 of FIG. 6 illustrates an example of how the guide mark 25 looks like when viewed from the Z direction (the direction along the Z axis) in the XYZ orthogonal coordinate system.

A-6 of FIG. 6 illustrates how the guide mark 25 illustrated in A-5 of FIG. 6 looks like when the guide mark 25 is viewed from the X direction (the direction along the X axis).

A-7 of FIG. 6 illustrates how the guide mark 25 illustrated in A-5 of FIG. 6 looks like when viewed from the Z direction (the direction along the Z axis) in a case where the guide mark 25 is rotated by a predetermined angle around the X axis in the XYZ orthogonal coordinate system.

A-8 of FIG. 6 illustrates how the guide mark 25 illustrated in A-7 of FIG. 6 looks like when the guide mark 25 is viewed from the X direction (the direction along the X axis).

As can be seen from the comparison between A-5 and A-6 in FIGS. 6 and A-7 and A-8 in FIG. 6, even when the same guide mark 25 is used, how the guide mark 25 looks like as viewed from the viewer 5 is considerably different between before and after the rotation of the guide mark 25 around the X axis by a predetermined angle.

In this way, by rotating the guide mark 25 around at least one coordinate axis of the display coordinate system (XYZ orthogonal coordinate system) or at least one coordinate axis of the local coordinate system (not illustrated) appropriately set corresponding to the extending direction of the branch road at the intersection, or the like, it is possible to appropriately and dynamically change how the guide mark 25 looks like as viewed from the viewer 5, and thus, for example, an unconventional visual sense can be produced so that the visibility of the guide mark 25 during a left turn (or a right turn) can be further improved.

Fifth Embodiment

Figure 7:
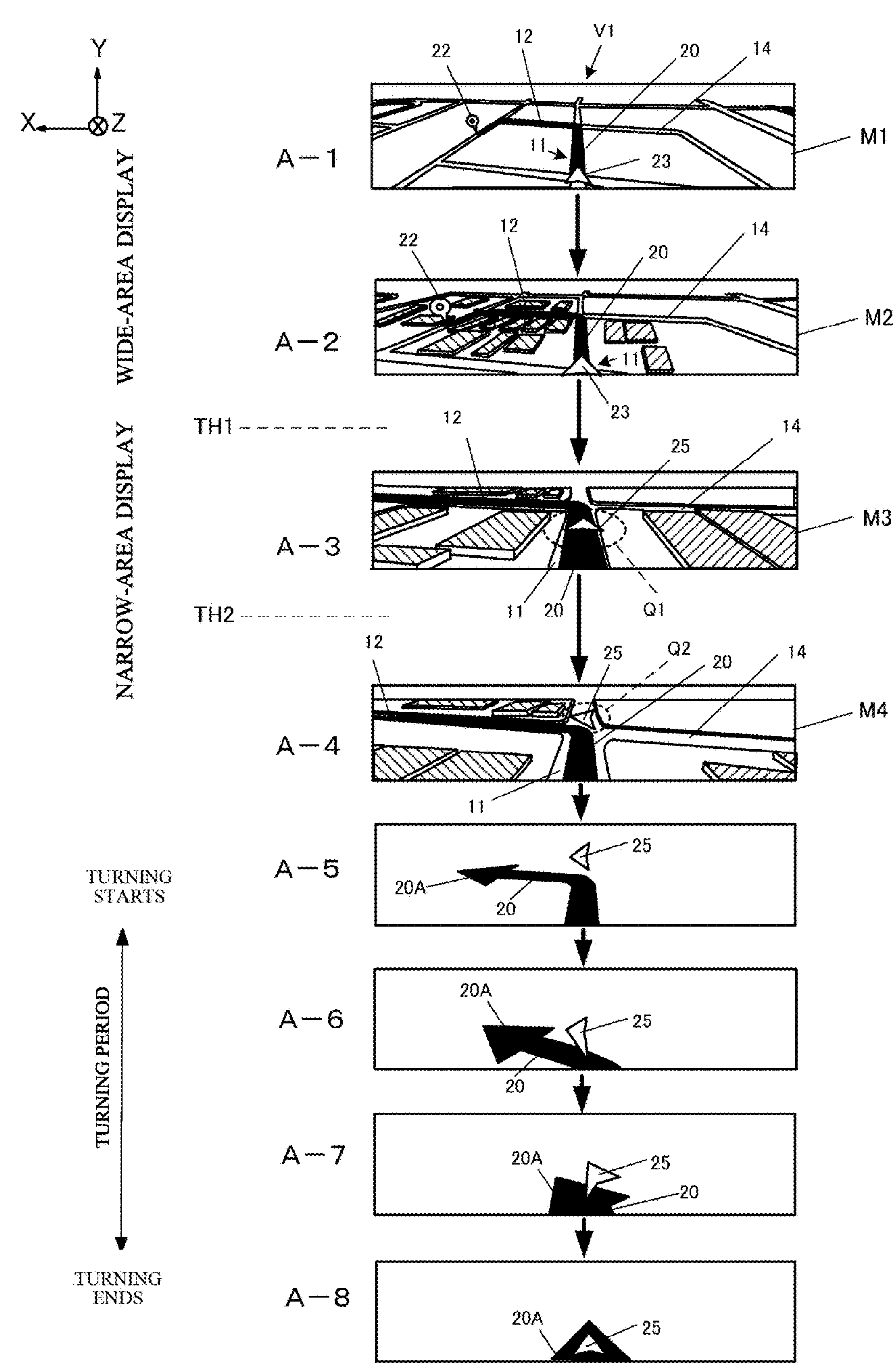
FIG. 7 is a diagram illustrating still another example of the wide-area display and the narrow-area display (including a display example during the turning period of the own vehicle).

Reference is now made to FIG. 7. FIG. 7 is a diagram illustrating still another example of the wide-area display and the narrow-area display (including a display example during the turning period of the own vehicle).

In FIG. 7, A-1 to A-3 of FIG. 7 are the same as A-1 to A-3 of FIG. 3 described above. Further, A-4 of FIG. 7 is the same as A-4 of FIG. 3 described above.

A-4 to A-8 in FIG. 7 illustrate display examples in the turning period of the vehicle 1. The display control of the guide mark and the like during the own-vehicle turning period is performed by the own-vehicle turning-period display control unit 91 described above in FIG. 2.

In A-4 to A-8 of FIG. 7, the map is not displayed, and the guide line 20 and the guide mark 25 are displayed.

In A-4 to A-8 of FIG. 7, the guide mark 25 is used as, for example, a turning guide display indicating that the own vehicle 1 is turning smoothly (a guide display indicating the orientation of the own vehicle 1 in accordance with a turning) in accordance with a left turn or a right turn.

Since the guide mark 25 is a mark having a function of guiding the traveling direction of the own vehicle 1 as a main function, the guide mark 25 can be used not only to guide the course to the intersection but also as a turning guide for dynamically indicating a change in the traveling direction during turning of the own vehicle 1 after reaching the intersection.

Therefore, it is possible to perform various guide displays which cannot be performed in the related art, and it is possible to further improve the convenience of the display device such as the HUD device 100.

In A-5 to A-7 of FIG. 7, the map is not displayed, and the guide line (the figure of the black arrow) 20 is illustrated. Further, an arrow 20A indicating a direction is displayed at the leading end portion of the guide line 20. Further, in A-8 of FIG. 7, only the arrow 20A at the leading end portion of the guide line 20 is illustrated.

Figure 9:
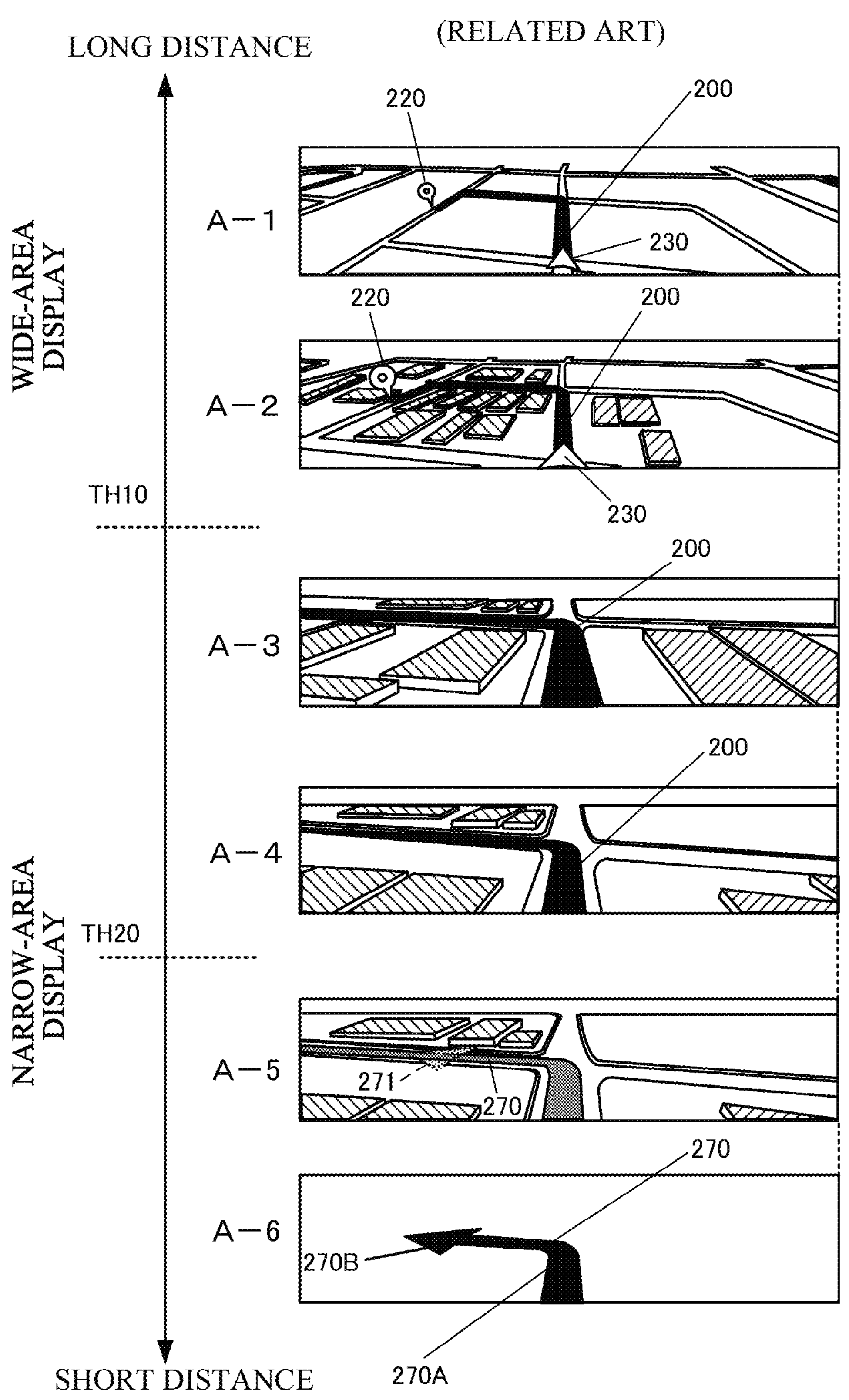
FIG. 9 is a diagram illustrating an example of wide-area display and narrow-area display according to a related art.

The guide line 20 illustrated in A-5 to A-8 of FIG. 7 corresponds to the guide line 270 illustrated in A-6 of FIG. 9 described above.

Further, as illustrated in A-5 to A-8 of FIG. 7, the shape of the guide mark 25 dynamically changes in response to the turning of the own vehicle 1 to make a left turn.

In order to change the shape, it is possible to use a technique for rotating, for example, the guide mark 25 described above with reference to A-5 to A-8 of FIG. 6 around the coordinate axis of the coordinate system (for example, at least one of the X axis, the Y axis, and the Z axis in the XYZ orthogonal coordinate system) as appropriate.

In A-7 of FIG. 7, the turning of the vehicle 1 ends, and accordingly, the guide mark 25 returns to the display state before the turning. In A-7 of FIG. 7, the guide mark 25 is displayed to overlap with the arrow 20A at the leading end portion of the guide line 20.

As described above, even during the turning of the vehicle 1, the guide mark 25 is used as the turning guide dynamically indicating the change in the traveling direction of the vehicle 1, and thus it is possible to perform various and dynamic guide displays which cannot be performed in the related art, and therefore, it is possible to further improve the convenience of the display device such as the HUD device 100.

Sixth Embodiment

According to the present embodiment, the guide mark 25 is also used as a warning display.

In A-4 to A-8 (display of the guide mark 25 in the turning period of the vehicle 1) of FIG. 7 described above, when the control unit 83 determines that the actual turning trajectory of the vehicle 1 deviates from the normal trajectory, the control unit 83 may change the display mode of the guide mark 25 to the display mode of the warning display for giving a warning to the viewer.

For example, it is possible to issue a warning to the viewer 5 by coloring the guide mark 25 in A-4 to A-8 of FIG. 7 described above in a predetermined color (for example, red or yellow), or further blinking the colored guide mark 25.

As described above, according to the sixth embodiment, when a turn deviating from the normal trajectory is recognized in the middle of turning of the vehicle 1, a warning can be issued by changing the display mode of the guide mark 25. As a result, for example, it is possible to prompt the viewer 5 to perform an appropriate driving operation and assist the viewer 5 to return to the normal trajectory.

Eighth Embodiment

Figure 8:
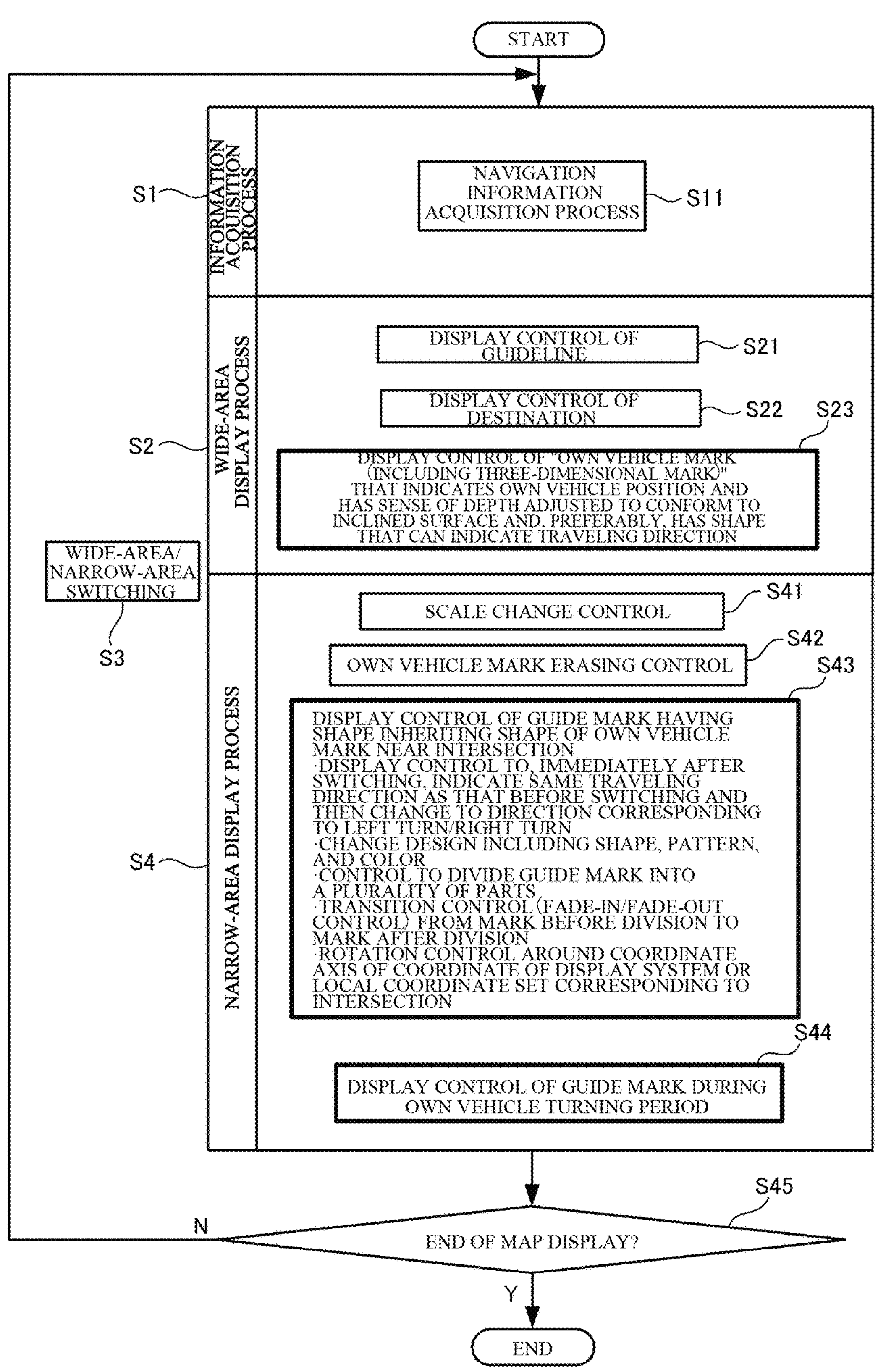
FIG. 8 is a flowchart illustrating an example of a procedure of display control.

FIG. 8 is a flowchart illustrating an example of a procedure of display control.

In step S1, an information acquisition process is performed. To be specific, for example, in step S11, a navigation information acquisition process is performed.

In step S2, a wide-area display process S2 is performed. Concretely, in step S21, the display control of the guide line is performed, and in step S22, the display control of the destination is performed.

In step S23, the display control of the own vehicle mark indicating the own vehicle position is performed.

Although the own vehicle mark is also displayed in the above-described example of FIG. 9 according to the related art, the own vehicle mark according to the present embodiment preferably has the sense of depth adjusted to conform to the inclined surface as the virtual image display surface and has a shape (a figure such as a triangular shape or an arrow shape, including a three-dimensional figure) that can indicate the traveling direction, and is essentially different from the conventional example of FIG. 9 in this respect.

Furthermore, in step S3, a wide-area/narrow-area switching process is performed.

In step S4, a narrow-area display process is performed.

Specifically, in step S41, the scale change control of the display image is performed, and in step S42, the own vehicle mark erasing control is performed.

Furthermore, in step S43, the display control of the guide mark having a shape inheriting the shape of the own vehicle mark (the identical or similar shape, and preferably the shape also having a common sense of depth) in the vicinity of the intersection is performed.

In a preferable example, the display control is performed such that, immediately after the wide-area/narrow-area switching, the own vehicle mark is displayed in the same traveling direction as that before the switching (and on the same road) in order to reduce the sense of discomfort felt by the viewer, and then the orientation of the own vehicle mark is changed in the direction corresponding to a left turn/right turn (the extending direction of the branch road).

In a preferred example, various display mode change processes can be performed.

For example, the design including the shape, pattern, and color of the guide mark may be changed.

Further, the control may be performed to divide the guide mark into a plurality of parts.

Further, transition control (fade-in/fade-out control) from a guide mark before division to a guide mark after division may be performed.

Further, rotation control may be performed to rotate the guide mark around a coordinate axis of a coordinate of the display system or a local coordinate set corresponding to the intersection.

In step S44, display control of the guide mark (preferably, dynamic display control in which a display posture (a shape of the guide mark or the like) is dynamically changed) is performed during the own vehicle turning period.

In step S45, it is determined whether to end the display of the map display (navigation image). In the case of Y, the process is terminated, and in the case of N, the process returns to step S1.

According to the present embodiment, it is possible to achieve the display control method capable of suppressing a sense of discomfort caused by the disappearance of the own vehicle mark indicating the own vehicle position and ensuring stable vision when the own vehicle approaches the intersection and the display image including the map is switched from the wide-area display to the narrow-area display.

As described above, according to the present invention, it is possible to achieve the display control capable of suppressing a sense of discomfort caused by the disappearance of the own vehicle mark indicating the own vehicle position and ensuring stable vision when the own vehicle approaches the intersection and the display image including the map is switched from the wide-area display to the narrow-area display.

Further, according to the present invention, it is possible to display a dynamic mark such as a guide display indicating a traveling direction even during a period in which the own vehicle is making a left turn or a right turn, and it is possible to improve the convenience of the display device.

Further, according to the present invention, it is possible to realize a display device or a projection display device with high functionality and improved convenience. As the projection display device, typically, a head-up display (HUD) device or a windshield display (WSD) device can be used. The term "projection display device" is to be interpreted broadly.

Further, the projection target member on which the image is projected may be a windshield of a vehicle or the like. Further, the projection target member may be a glasses portion of a glasses head mounted display, and in this case, the head mounted display can be grasped as a kind of a head-up display in a broad sense. Therefore, it can be included in the present invention.

The present invention is not limited to the embodiments described above, and various modifications and applications are possible. For example, the guide mark may have a function of issuing a warning in addition to the function of indicating the traveling direction of the vehicle. Further, as the shape of the guide mark, a triangular shape or an arrow shape can be used, but the shape is not limited thereto, and various shapes can be used.

Further, the HUD device or the display system includes a device used as a simulator (for example, a simulator of an aircraft, a simulator as a game device, or the like).

Further, in the above-described embodiment, the HUD device has been mainly described as an example of the projection display device, but the projection display device is not limited thereto, and for example, an in-vehicle projector or the like can also be used.

The present invention is not limited to the exemplary embodiments described above, and a person skilled in the art can easily modify the exemplary embodiments described above to the extent that they fall within the scope of the claims.

REFERENCE SIGNS LIST

1 VEHICLE, OWN VEHICLE, OWN VEHICLE
2 PROJECTION TARGET MEMBER (WINDSHIELD OR THE LIKE)
5 VIEWER (DRIVER OR THE LIKE) WHO IS PASSENGER IN VEHICLE
3 VIEWPOINT (EYE)
6 ROAD SURFACE OF ROAD
11 ROAD (STRAIGHT ROAD) WHERE VEHICLE IS TRAVELING ON MAP
11' ROAD (STRAIGHT ROAD) WHERE VEHICLE IS TRAVELING IN ACTUAL VIEW
12 BRANCH ROAD (LEFT TURN ROAD) AT INTERSECTION ON MAP
12' BRANCH ROAD (LEFT TURN ROAD) AT INTERSECTION IN ACTUAL VIEW
14 BRANCH ROAD (RIGHT TURN ROAD) AT INTERSECTION ON MAP
14' BRANCH ROAD (RIGHT TURN ROAD) AT INTERSECTION IN ACTUAL VIEW
22 DISPLAY OF DESTINATION (DESTINATION MARK)
20 GUIDE LINE
20A ARROW AT LEADING END PORTION OF GUIDE LINE
23 (23*a*, 23*b*) OWN VEHICLE MARK
25 GUIDE MARK
28*a* TO 28*d*, 29*a* TO 29*d* IMAGE AFTER DIVISION (GUIDE ELEMENT)
41 DASHBOARD
65 COMMUNICATION UNIT
70 NAVIGATION DEVICE
71 NAVIGATION INFORMATION ACQUISITION UNIT
72 DRIVING ROUTE INFORMATION ACQUISITION UNIT
73 OWN VEHICLE POSITION INFORMATION ACQUISITION UNIT
74 MAP INFORMATION
75 OWN VEHICLE POSITION INFORMATION
76 DISPLAY DATABASE
77 ECU
81 INFORMATION ACQUISITION UNIT
82 STORAGE
83 CONTROL UNIT
84 WIDE-AREA/NARROW-AREA SWITCHING CONTROL UNIT
85 WIDE-AREA DISPLAY CONTROL UNIT
86 OWN VEHICLE MARK DISPLAY CONTROL UNIT
87 NARROW-AREA DISPLAY CONTROL UNIT
88 OWN VEHICLE MARK ERASING CONTROL UNIT
89 GUIDE MARK DISPLAY CONTROL UNIT
90 OWN-VEHICLE PRE-TURNING DISPLAY CONTROL UNIT
91 OWN-VEHICLE TURNING-PERIOD DISPLAY CONTROL UNIT
93 PROJECTION UNIT
95 DISPLAY OPTICAL SYSTEM
100 HUD DEVICE
115 DISPLAY SYSTEM
150 DISPLAY DEVICE (IMAGE GENERATION UNIT) SUCH AS LIQUID CRYSTAL PANEL
151 DISPLAY UNIT (SCREEN OR THE LIKE)
164 DISPLAY SURFACE
170 CURVED MIRROR
179 REFLECTION SURFACE
PSa TO PSc VIRTUAL IMAGE DISPLAY SURFACE (IMAGING SURFACE)
K DISPLAY LIGHT
V1 IMAGE (VIRTUAL IMAGE)
M1 TO M4 MAP (MAP IMAGE)

The invention claimed is:

1. A display control apparatus comprising a control unit that controls image display of a display device that is mounted in a vehicle and causes a viewer who is an occupant of the vehicle to visually recognize an image, wherein the control unit performs wide-area display control to, when a distance from the vehicle to an intersection ahead of the vehicle is more than a first threshold under a driving situation in which the vehicle needs to turn left or right at the intersection, display, at a first scale, a first map that is a bird's-eye view of a surrounding area including an area ahead of the vehicle, and display an own vehicle mark having a predetermined shape capable of indicating a position of the vehicle and indicating a traveling direction of the vehicle to overlap with a first road on the first map corresponding to a road where the vehicle is actually traveling, and performs narrow-area display control to, when the vehicle further approaches the intersection and the distance from the vehicle to the intersection becomes equal to or less than the first threshold, erase the own vehicle mark, display, at a second scale larger than the first scale, a second map that is a bird's-eye view of the vicinity of the intersection, and display a guide mark having a shape identical or similar to the predetermined shape of the own vehicle mark and indicating a traveling direction of the vehicle at a first position of the first road on the second map to overlap with the first road by adjusting the scale so as not to interfere with visual recognition of the intersection on the second map.

2. The display control apparatus according to claim 1, wherein when the vehicle further approaches the intersection and the distance from the vehicle to the intersection become equal to or less than a second threshold that is less than the first threshold, the control unit moves a display position of the guide mark from the first position to a second position that is farther than the intersection on the second map as viewed from the viewer or to a third position that is a position of a branch road of the intersection on the second map and changes a traveling direction indicated by the guide mark to an extending direction of the branch road.

3. The display control apparatus according to claim 2, wherein the control unit performs, for the guide mark, display mode change control to change at least one of a shape, a pattern, a color, and luminance, display mode change control to divide the guide mark into a plurality of images, display mode change control to divide the guide mark into a plurality of images and change at least one of a shape, a pattern, a color, and luminance, display mode change control to divide the guide mark into a plurality of images, provide a period in which one image before the division and the plurality of images after the division coexist at the time of the division, cause the one image to fade out with time, and cause the plurality of images to fade in with time, or display mode change control to rotate the guide mark around at least one coordinate axis of a display coordinate system set in a space ahead of the vehicle and used for displaying an image, or rotate the guide mark around at least one coordinate axis of a local coordinate system set corresponding to the intersection in the space ahead.

4. The display control apparatus according to claim 1, wherein the control unit performs display control to display a display image as a virtual image on a virtual image display surface that is virtual and is a flat surface or a curved surface inclined with respect to a road surface of a road where the vehicle is traveling, sets the predetermined shape of the own vehicle mark to be a shape that causes the viewer to perceive a sense of depth corresponding to at least one of a shape of the virtual image display surface and an inclination angle with respect to the road surface, and sets a shape of the guide mark to be a shape that causes the viewer to perceive a sense of depth that is common to the sense of depth in the own vehicle mark when the guide mark is displayed in a posture and a position that are common to the own vehicle mark.

5. The display control apparatus according to claim 1, wherein, during a turning period in which the vehicle is turning in accordance with a left turn or a right turn, the control unit changes a display mode of the guide mark to dynamically change a traveling direction indicated by the guide mark to correspond to the turning of the vehicle.

6. The display control apparatus according to claim 5, wherein when it is determined that a trajectory of an actual turning of the vehicle deviates from a normal trajectory, the control unit changes a display mode of the guide mark to a display mode of a warning display that gives a warning to the viewer.

7. A display device comprising:

a display unit that displays an image; and the display control apparatus according to claim 1.

8. The display device according to claim 7, wherein the display device is a projection display device that projects display light of an image displayed on the display unit onto a projection target member to display the image as a virtual image on a virtual image display surface.

9. A display control method for controlling image display of a display device that is mounted in a vehicle and causes a viewer who is an occupant of the vehicle to visually recognize an image, the display control method comprising:

a step of performing wide-area display control to, when a distance from the vehicle to an intersection ahead of the vehicle is more than a first threshold under a driving situation in which the vehicle needs to turn left or right at the intersection, display, at a first scale, a first map that is a bird's-eye view of a surrounding area including an area ahead of the vehicle, and display an own vehicle mark having a predetermined shape capable of indicating a position of the vehicle and indicating a traveling direction of the vehicle to overlap with a first road on the first map corresponding to a road where the vehicle is actually traveling; and a step of performing narrow-area display control to, when the vehicle further approaches the intersection and the distance from the vehicle to the intersection becomes equal to or less than the first threshold, erase the own vehicle mark, display, at a second scale larger than the first scale, a second map that is a bird's-eye view of the vicinity of the intersection, and display a guide mark having a shape identical or similar to the predetermined shape of the own vehicle mark and indicating a traveling direction of the vehicle at a first position of the first road on the second map to overlap with the first road by adjusting the scale so as not to interfere with visual recognition of the intersection on the second map.

* * * * *